United States Patent Office 3,308,153
Patented Mar. 7, 1967

3,308,153
PROCESS FOR PRODUCTION OF BIS (β-HYDROXYETHYL) TEREPHTHALATE
Seikichi Matsuhisa, Yoshio Miyama and Tadao Tsutsumi, Shizuoka-ken, Japan, assignors to Toyo Rayon Kabushiki Kaisha, Tokyo, Japan, a corporation of Japan
No Drawing. Filed Aug. 12, 1963, Ser. No. 301,594
Claims priority, application Japan, Aug. 15, 1962, 37/33,768; Sept. 13, 1962, 37/39,619; Oct. 9, 1962, 37/44,619
2 Claims. (Cl. 260—475)

This invention relates to a process for production of bis (β-hydroxyethyl) terephthalate. More particularly, the invention relates to a process for single stage production of bis (β-hydroxyethyl) terephthalate by reacting terephthalonitrile, ethylene glycol, and water, the improvement comprising the use as a catalyst of at least one metallic compound selected from the group consisting of oxides and salts of copper, zinc, cadmium, mercury, nickel, manganese and cobalt.

For production of bis (β-hydroxyethyl) terephthalate, many processes are known, among which industrially employed being that of ester-interchange of dimethyl terephthalate with ethylene glycol, or that of esterification of terephthalic acid with ethylene glycol. Also as a process for synthesizing bis (β-hydoxyethyl) terephthalate by single stage reaction of terephthalonitrile, ethylene glycol and water, British Patent No. 800,875 is known. Said patent discloses that a good result can be obtained by mixing terephthalonitrile, water and ethylene glycol at the quantitative ratio of:

Ethylene glycol—5–10 mols/mol nitrile group
Water—1 mol/mol nitrile group, and reacting them at temperatures under which the generated ammonia can be excluded from the system (not lower than 150° C.). Also as the catalyst useful for the reaction, said patent discloses hydroxides of alkali metals and of alkali earth metals, salts of weak acid, and basic compounds such as alcoholate, pyridine and ammonia.

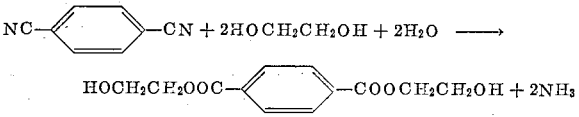

For production of terephthalonitrile, recently developed is a process wherein p-xylene is air-oxidized at gaseous phase in presence of ammonia. We performed an extensive research on the catalysts to be used for single stage synthesis of bis (β-hydroxyethyl) terephthalate by reacting said terephthalonitrile, ethylene glycol and water, and reached the subject invention.

The invention relates to a process, wherein at the time of single stage synthesis of bis (β-hydroxyethyl) terephthalate by reacting terephthalonitrile, ethylene glycol and water, one or mixture of oxides and salts of copper, zinc, cadmium, mercury, nickel, manganese and cobalt are used.

As these metallic compounds, any of oxides, inorganic and organic acid salts of the foregoing metals is suitable.

According to the invention, by the use of such catalyst bis (β-hydroxyethyl) terephthalate can be synthesized at much higher yield compared with those obtained with heretofore known alkaline catalysts, etc.

Further for the practice of this invention, it is preferred that terephthalonitrile, ethylene glycol and water be used at the mol ratio of:

Ethylene glycol—nitrile group 1–12, particularly 5–10
Water—nitrile group 0.5–5, particularly around 1, and the reaction temperature be about 100°–300° C., particularly 180°–280° C. Also the pressure at the time of reaction may be atmospheric, or elevated.

The suitable amount of the catalyst for use of this invention is 0.01–1 wt. percent of terephthalonitrile.

By adopting the process of the present invention, from terephthalonitrile bis (β-hydroxyethyl) terephthalate can be synthesized with a high yield.

The process of the present invention shall be explained with reference to examples hereinbelow.

Example 1

Twenty (20) g. of terephthalonitrile, 98 g. of ethylene glycol, 6 g. of water, and 0.2 g. of copper acetate were put in a three-necked flask of 500 ml. capacity provided with a reflux condenser, a stirrer and a nitrogen inlet tube, said flask then being steeped in an oil bath of 200° C. and heated under reflux while nitrogen saturated with water being introduced thereinto. The generated ammonia was led from the end of the reflux condenser to an absorption bottle filled with 1000 ml. of 1 N sulfuric acid and thereby absorbed. After the reaction, by back titration with aqueous solution of sodium hydroxide the conversion was calculated. After five hours of heating under reflux, the conversion was 82.5%. By filtration of the reaction product after cooling, 32.5 g. of bis (β-hydroxyethyl) terephthalate of M.P. 108–110° C. were obtained.

Further by distilling off ethylene glycol from the mother liquor at 5 mm. Hg, additional 4.2 g. of bis (β-hydroxyethyl) terephthalate were obtained.

Example 2

Two (2) g. of terephthalonitrile, 9.8 g. of ethylene glycol, 0.6 g. of water and 0.02 g. of cuprous oxide were put in a test tube provided with a reflux condenser and a nitrogen inlet tube. The test tube was then steeped in an oil bath of 200° C. and heated under reflux while nitrogen saturated with water being introduced thereinto. The generated ammonia was led from the end of the reflux condenser to an absorption bottle filled with 100 ml. of 1 N sulfuric acid and thereby absorbed. After the reaction the conversion was calculated by back titration with an aqueous solution of sodium hydroxide. After five hours of heating under reflux, the conversion was 82.6%.

Example 3

Using the same reaction apparatus as used in Example 2, the catalytic activities of the following compounds were examined under the conditions specified below. The results were shown in Table I, in which that wherein no catalyst was used, and those wherein each sodium methylate and sodium isopropylate was used are controls.

Reactant mixture:
    Terephthalonitrile _____ g__ 2
    Ethylene glycol _____ g__ 9.8
    Water _____ g__ 0.6
    Catalyst _____ g__ 0.01
Reaction condition:
    Bath temperature _____ ° C__ 200–220
    Reaction time _____ hours__ 5

TABLE I

| Catalyst: | Conversion (percent) |
|---|---|
|  | 43.5 |
| Sodium methylate | 87.8 |
| Sodium isopropylate | 87.4 |
| Cupric oxide | 87.4 |
| Cuprous chloride | 100.0 |
| Cupric chloride | 95.4 |
| Cupro-ammonium chloride | 89.6 |
| Basic copper carbonate | 83.4 |
| Copper chromate | 78.1 |
| Copper nitrate | 76.5 |

Example 4

Twenty (20) g. of terephthalonitrile, 98 g. of ethylene glycol, 6 g. of water and 0.2 g. of cadmium acetate were put in a three-necked flask of 500 ml. capacity provided with a reflux condenser, a stirrer, and a nitrogen inlet tube. Said flask was then steeped in an oil bath of 200° C. and heated under reflux while nitrogen saturated with water being introduced thereinto. The generated ammonia was led from the end of the reflux condenser to an absorption bottle filled with 1000 ml. of 1 N sulfuric acid and thereby absorbed. After the reaction, by back titration with aqueous solution of sodium hydroxide the conversion was calculated.

After five hours of heating under reflux, the conversion reached 99.8%. By distilling off the unreacted ethylene glycol from the reaction product at 5 mm. Hg after cooling, 37.5 g. of bis (β-hydroxyethyl) terephthalate of M.P. 108–110° C. were obtained.

Example 5

Two (2) g. of terephthalonitrile, 9.8 g. of ethylene glycol, 0.6 g. of water and 0.02 g. of zinc acetate were put in a test tube provided with a reflux condenser and a nitrogen inlet tube. Said test tube was then steeped in an oil bath of 200° C. and heated under reflux while nitrogen saturated with water being introduced thereinto. The generated ammonia was led from the end of the reflux condenser to an absorption bottle filled with 100 ml. of 1 N sulfuric acid and thereby absorbed. After the reaction, by back titration with aqueous solution of sodium hydroxide the conversion was calculated. After five hours of heating under reflux, the conversion reached 98.1%.

Example 6

Using the same reaction apparatus as used in Example 2, the catalytic activities of the following compounds were examined under the conditions specified below. The results were shown in Table II, in which the test wherein no catalyst was used, and those wherein each sodium ethylate and sodium isopropylate was used being controls.

Reactant mixture:
  Terephthalonitrile _____g__  2
  Ethylene glycol _____g__  9.8
  Water _____g__  0.6
  Catalyst _____g__  0.01
Reaction condition:
  Bath temperature _____°C__  200–220
  Reaction time _____hours__  5

TABLE II.—RESULTS OF SCREENING TEST

| Catalyst: | Conversion (percent) |
|---|---|
|  | 43.5 |
| Sodium ethylate | 87.8 |
| Sodium isopropylate | 87.4 |
| Zinc oxide | 74.9 |
| Zinc carbonate | 80.6 |
| Cadmium nitrate | 92.6 |
| Cadmium carbonate | 75.5 |
| Cadmium oxide | 98.5 |
| Mercurous acetate | 70.4 |

Example 7

Twenty (20) g. of terephthalonitrile, 98 g. of ethylene glycol, 6 g. of water, 0.2 g. of cobalt acetate were put in a three-necked flask of 500 ml. capacity provided with a reflux condenser, a stirrer, and a nitrogen inlet tube. The flask was then steeped in an oil bath of 200° C. and heated under reflux while nitrogen saturated with water being introduced thereinto. The generated ammonia was led from the end of the reflux condenser to an absorption bottle filled with 1000 ml. of 1 N sulfuric acid and thereby absorbed. After the reaction the conversion was calculated by back titration with an aqueous solution of sodium hydroxide.

After five hours of heating under reflux, the conversion was 96.4%. After cooling the reaction product, by distilling off the unreacted ethylene glycol therefrom at 5 mm. Hg, 37.0 g. of bis (β-hydroxyethyl) terephthalate of M.P. 108–110° C. were obtained.

Example 8

Two (2) g. of terephthalonitrile, 9.8 g. of ethylene glycol, 0.6 g. of water and 0.02 g. of nickel acetate were put in a test tube provided with a reflux condenser and a nitrogen inlet tube. The tube was then steeped in an oil bath of 200° C. and heated under reflux while nitrogen saturated with water being introduced thereinto. The generated ammonia was led from the end of the reflux condenser to an absorption bottle filled with 100 ml. of 1 N sulfuric acid and thereby absorbed. After the reaction, the conversion was calculated by back titration with an aqueous solution of sodium hydroxide. The conversion after five hours of heating under reflux was 90.5%.

Example 9

Using the same reaction apparatus as used in Example 2, the catalytic activities of the following compounds were examined under the conditions specified below. The results were shown in Table III. In the same table, the test wherein no catalyst was used, and those wherein each sodium ethylate and sodium propylate was used are controls.

Reactant mixture:
  Terephthalonitrile _____g__  2
  Ethylene glycol _____g__  9.8
  Water _____g__  0.6
  Catalyst _____g__  0.01
Reaction condition:
  Bath temperature _____°C__  200–220
  Reaction time _____hours__  5

TABLE III.—RESULTS OF SCREENING TEST

| Catalyst: | Conversion (percent) |
|---|---|
|  | 43.5 |
| Sodium ethylate | 87.8 |
| Sodium isopropylate | 87.4 |
| Manganese acetate | 79.4 |
| Manganese carbonate | 71.4 |
| Manganese formate | 90.4 |
| Manganese dioxide | 79.4 |
| Cobalt chloride | 90.5 |
| Cobalt formate | 90.2 |
| Cobalt oxide | 76.8 |
| Nickel formate | 85.4 |
| Nickel oxide | 66.1 |

Thus various embodiments of the present invention having been shown, the invention is by no means limited by the above examples. The catalysts useful for the invention neither are limited to those shown in the above examples. Besides those shown in the above examples, in the invention any of corresponding oxides and salts of said copper, zinc, cadmium, mercury, nickel, manganese and cobalt are useful. Typical of these may be listed as follows:

| | |
|---|---|
| Copper sulfate | Zinc formate |
| Copper borate | Zinc oxalate |
| Copper oxalate | Zinc lactate |
| Copper citrate | Zinc tartarate |
| Copper lactate | Zinc benzoate |
| Copper benzoate | Zinc terephthalate |
| Copper terephthalate | Cadimium chloride |
| Copper hydroxide | Cadmium sulfate |
| Zinc chloride | Cadmium phosphate |
| Zinc sulfate | Cadmium stearate |
| Zinc nitrate | Cadmium oxalate |
| Zinc phosphate | Cadmium maleate |
| Zinc borate | Cadmium benzoate |
| Zinc selenate | Cadmium terephthalate |

Mercuric chloride
Mercuric acetate
Nickel chloride
Nickel nitrate
Nickel oxalate
Nickel benzoate
Nickel terephthalate
Basic nickel carbonate
Cobalt nitrate
Cobalt sulfate
Cobalt phosphate
Cobalt carbonate
Cobalt oxalate
Cobalt benzoate
Cobalt terephthalate
Manganese chloride
Manganese sulfate
Manganese phosphate
Manganese benzoate
Manganese terephthalate

We claim:

1. Process for production of bis (β-hydroxyethyl) terephthalate which comprises reacting terephthalonitrile, water and ethylene glycol in the presence of at least one metallic compound as a catalyst selected from the group consisting of corresponding oxides and salts of copper, zinc, cadmium, mercury, nickel, manganese and cobalt, at a temperature within the range of from about 100 to about 300° C.

2. Process for production of bis (β-hydroxyethyl) terephthalate which comprises reacting terephthalonitrile, water and ethylene glycol in the presence of 0.01–1 wt. percent based on the terephthalonitrile of at least one compound selected from oxides and salts of copper, zinc, cadmium, mercury, nickel, manganese and cobalt, at temperatures ranging from 100–300° C.

References Cited by the Examiner

UNITED STATES PATENTS

| | | | |
|---|---|---|---|
| 2,921,088 | 1/1960 | Gasson et al. | 260—475 |
| 3,007,959 | 11/1961 | Meyer | 260—475 |
| 3,010,991 | 11/1961 | Meyer | 260—475 |
| 3,060,223 | 10/1962 | McKinney | 260—475 |

LORRAINE A. WEINBERGER, *Primary Examiner.*

R. JACKSON, T. GALLOWAY, *Assistant Examiners.*